United States Patent [19]

Snodgrass et al.

[11] Patent Number: 5,710,789
[45] Date of Patent: Jan. 20, 1998

[54] SIGNAL SYNCHRONIZATION SYSTEM FOR ENCODED SIGNALS

[76] Inventors: Timothy E. Snodgrass, 2054 Sisley Grove Rd., Palo, Iowa 52324; Scott J. F. Zogg, 2765 Tower Dr., Cedar Rapids, Iowa 52411

[21] Appl. No.: 681,260

[22] Filed: Jul. 22, 1996

[51] Int. Cl.⁶ .................................................. H04L 27/26
[52] U.S. Cl. ........................ 375/202; 375/347; 375/367; 370/515; 455/132
[58] Field of Search .......................... 375/202, 207, 375/343, 347, 367; 370/515; 455/132, 133; 364/728.03

[56] References Cited

U.S. PATENT DOCUMENTS

| | | |
|---|---|---|
| 4,280,222 | 7/1981 | Flower ................................ 375/370 |
| 4,597,087 | 6/1986 | Kadin ................................. 375/370 |
| 4,612,652 | 9/1986 | Kadin ................................. 375/202 |
| 4,616,364 | 10/1986 | Lee .................................... 375/347 |

*Primary Examiner*—Temesghen Ghebretinsae
*Attorney, Agent, or Firm*—Kyle Eppele; M. Lee Murrah

[57] ABSTRACT

A system for receiving, correlating and interpreting secured wireless transmissions, periodic or otherwise, including multiplexed receivers, robust correlator design, a state machine device for controlling the receivers and correlation function, and the ability to determine signal spatial diversity via switched antenna signal processing. The correlator is constructed to include a synchronization scheme adaptive to any variety of input signals from the coupled receiver tuned frequencies.

13 Claims, 7 Drawing Sheets

SIGNAL SYNCHRONIZATION SYSTEM FOR ENCODED SIGNALS

FIELD OF INVENTION

The present invention relates generally to wireless data transmission, and more particularly to robust communication systems employing frequency-hopping transmission schemes, multiple antenna, spread spectrum techniques or some combination of the aforementioned concepts.

BACKGROUND OF THE INVENTION

The goal of any communication system is the accurate conveyance of a desired message from a first party to an intended second party. Transmitted signals often are subject to interference, intentional or otherwise, which can render the received signal unintelligible. In the case of secured transmissions, a variety of schemes are employed to counter the effect of unwanted reception or intentional interference. Among the more common methods in use today in secured transmission systems are spread-spectrum, frequency-hopped, coding or a hybrid system. Such techniques provide enhanced transmission security and integrity by requiring a receiver to be in synchronization with the frequency hopped, transmitted signal in order to process the transmitted data.

In order to establish synchronization with a hybrid transmitted signal as described above, most prior art signal processing methods require a dedicated receiver for each known frequency that the transmitted signal may occupy during synchronization. When processing such signals a special matched filter, generally referred to as a correlator, is utilized for obtaining signal synchronization. The correlator produces as its output value, the maximum peak-signal-power/average-noise-power ratio when the input is comprised of a known signal and a noise component.

The expense associated with such a system could be significantly reduced if a single receiver could be utilized in processing more than one transmission frequency. Synchronization between the correlator and the receiver mandates that implementation of a multi-frequency receiver be simultaneously controlled with its correlator. Known prior art systems that provide such system functionality are rather limited in their approach.

A secured system employing a single receiver to handle two frequencies of a frequency hopped signal by including a clocking function and a code sequence generator that enables one half of a correlator with a predetermined code is known in the art. Although providing some minimization of dedicated hardware, such a system is unfortunately severely constrained in numerous operating requirements. Frequencies must be grouped in pairs, pulse spacing in each pair of frequencies is dependent upon a common multiple, and periodic pulses are a few of the major constraints of the prior art systems. Additionally, increased functionality beyond the mere reduction in receiver count is also a desired quality in any operating system.

Accordingly, a robust system for effectively communicating in an environment of suspected high interference is highly desired.

SUMMARY OF THE INVENTION

The present invention comprises a system for receiving secured wireless signal transmissions having one or more receivers capable of being tuned to N frequencies, wherein N is an integer value, antenna located at one or more positions and coupled to the receiver(s), one or more correlators for synchronizing the various encoded transmitted signals, coupled to one or more receivers and also to additional processing means, and a state machine device coupled to and controlling the receiver frequency setting and the correlator in response to predetermined settings from an electronically coupled controller.

In one embodiment of the above system three antenna spatially spaced a significant distance are coupled via a controlled switch to two receivers, each receiver tuned to receive a different frequency. A correlator is coupled to the output signal of each receiver and has a decode scheme, or mask, loaded into it that is enabled by a signal from the state machine that also, contemporaneously controls the receiver frequency tuning and antenna selection. A logic controller, herein referred to as a code generator, is coupled to the state machine for selecting the receiver frequency tuning and corresponding correlator decode scheme, respectively, and operates in accordance with a predetermined setting. Additional processing means are provided for interpreting the output signals of the correlator.

Alternate embodiments of the present apparatus include variations on the number and location of antenna, the number and frequency setting of the receivers and the corresponding correlator structure unique to a given receiver configuration.

It is an object of the present invention to provide a frequency-hopped communication system having improved performance against a partial band jammer.

It is a feature of the present invention to utilize a state machine device to control both receiver frequency settings and correlator operations.

It is yet another feature of the present invention to utilize switchable antenna having measurably different locations or surroundings.

It is yet another feature of the present invention to utilize a correlator having a mask for synchronizing any given arrangement of non-periodic received signals.

It is an advantage of the present invention that the system cost and size are reduced over prior art systems covering similar frequency ranges of transmitted signals.

It is another advantage of the present invention that correlated synchronized signals also provide signal spatial diversity information.

It is another advantage of the present invention that a correlator capable of handling a wide variety of coded signal is described.

These and other objects, features and advantages are disclosed and claimed in the specification, figures, and claims of the present application.

DETAILED DESCRIPTION OF THE PREFERRED EMBODIMENTS

Figure 1:
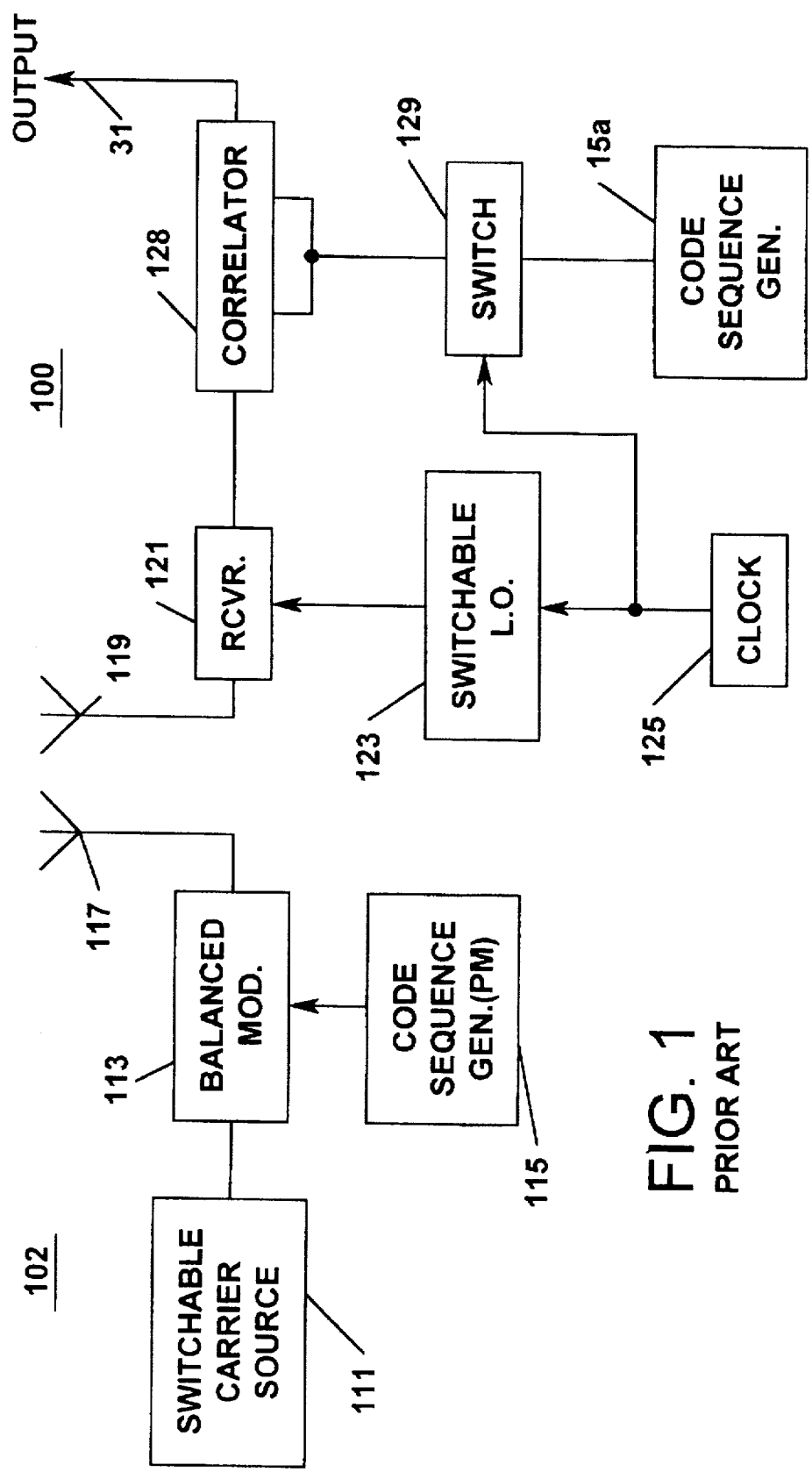
FIG. 1 illustrates a block diagram of a system having a receiver having paired frequencies with a correlator, as known in the prior art.

Referring now to the drawings, wherein like items are referenced as such throughout, FIG. 1 illustrates a prior art communication system implementing paired frequencies on a single receiver. A transmitter 102 includes a switchable carrier source 111 which can switch between frequencies $f_1$ and $f_2$ and is coupled to a balanced modulator 113 which also receives an input signal from a code generator 115. The output signal of the balanced modulator is coupled to an antenna 117. The transmitted signal may be on any of $f_n$ frequencies, each frequency having a corresponding code $c_n$ and having a predetermined duration. A receiver system 100 is comprised of an antenna 119, a receiver set 121, a switchable local oscillator 123, a correlator 128, a clock signal generator 125, a switch 129 and a code sequence generator 115A, all coupled as shown. In operation, the switch 129 and switchable oscillator 123 are activated in response to a signal from the clock 125. The correlator 128 is actually divided into two sections, a first section for correlating a code $c_x$ with a frequency $f_x$ and a second section for correlating code $c_n$ with frequency $f_n$. In this manner, the receiver 121 could operate on either of a given number of frequencies of a transmitted signal, limited by the transmission scheme being periodic.

Figure 2:
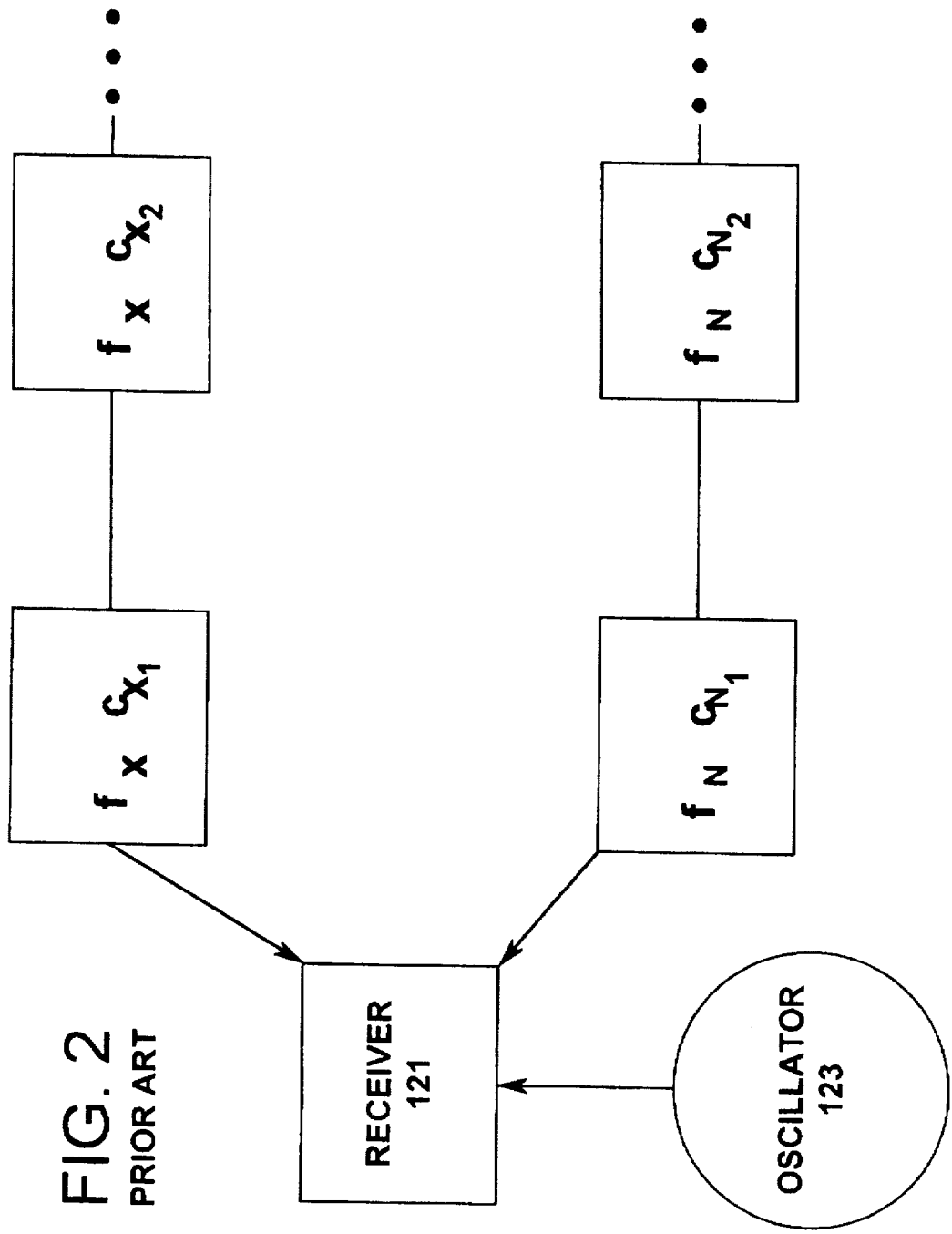
FIG. 2 illustrates the signal processing synchronization methodology employed by the receiver of FIG. 1.

The above described operation may be readily visualized by observing the block diagram of FIG. 2. The receiver 121, in response to a square wave switching command via local oscillator 123, receives the signal $f_x$, $c_{x1}$–$c_{x2}$ or $f_n$, $c_{n1}$–$c_{n2}$. The switching between the two frequencies is predetermined and dependent in part on the periodic nature of the code c.

Figure 3:
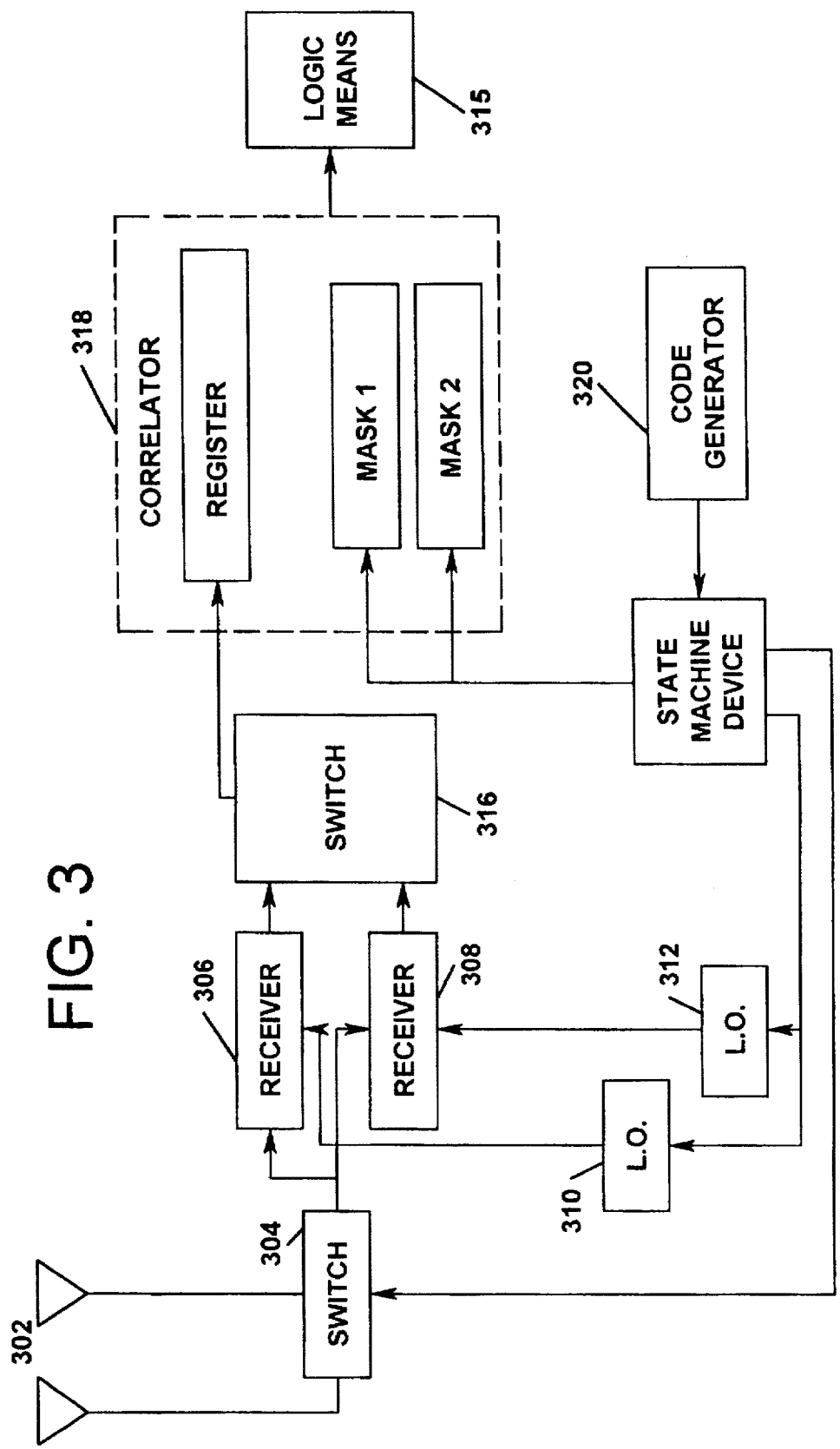
FIG. 3 illustrates a block diagram of a receiver system implementing one embodiment of the present invention.

In contrast to the prior art, FIG. 3 illustrates a receiver system 300 that includes the teachings of the present invention. Although described in terms of a frequency-hopped signal system, it is understood that many of the advantages of the present system would be applicable to any type of transmitted signal, such as continuous wave and is not limited to frequency-hopped systems. An antenna array 302 is coupled via a switch 304 to a first and second receiver 306, 308. A first clock 310 and a second clock 312 are coupled to the receivers 306, 308, as shown and are also coupled to and receiving a control signal from a state machine device 314. Likewise, the switch 304 and a second switch 316 are also controlled by the state machine device 314. Each of the receivers 306, 308 are coupled via switch 316 to a correlator 318. The correlator is loaded with decode schemes, or masks, representing various code segments of the frequencies to be received on the receiver system 300. The masks, can be constructed in any combination of frequency duration or combination and need not be of equal duration or sequential alternate enablement between frequencies. Each received frequency has its own mask. A code generator 320 is coupled to the state machine device 314 and provides the specific decode scheme for a given frequency at any given time.

Figure 4:
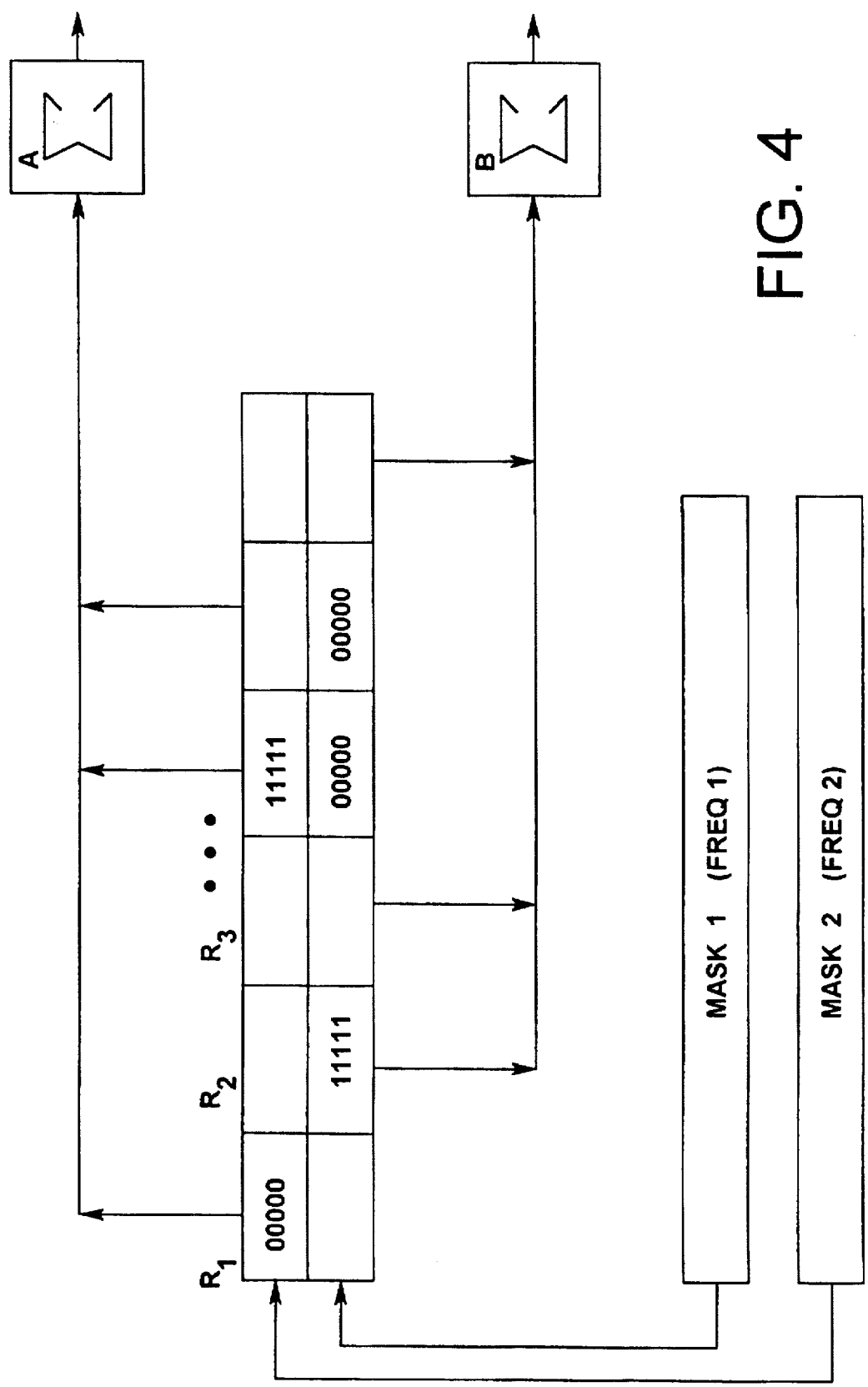
FIG. 4 illustrates a block diagram of a correlator implementing the teachings of the present invention.

The operation of the correlator 318 can be better understood by reviewing FIG. 4. The correlator is comprised of a plurality of registers $R_1$- $R_n$ for accepting the digital representation of the transmitted signal synchronization portion at any given time. The registers are depicted in two rows for ease in illustrating the various activation period of frequency $f_1$ or $f_2$. It is understood that the advantages of the present invention are not limited to a correlator comprised only of two decode mask, but is illustrated with two for simplicity of understanding. The correlator could consist of any number of rows of registers in complementary fashion to associated receivers, such as three, four, five, and so on. The values of the processed signal loaded into $f_1$ registers are summed via a summer A. Likewise the values of $f_2$ are summed via a summer B. The combined output signals of the summers represents over time is utilized in conjunction with the respective mask in order to obtain synchronization of the transmitted signal for further processing. The mask value is determined by the control signal from the state machine and may be any combination of one or zeroes and is unique for each frequency. In this manner any number of frequencies may be correlated by a single correlator, including non-periodic transmitted signals.

Figure 5:
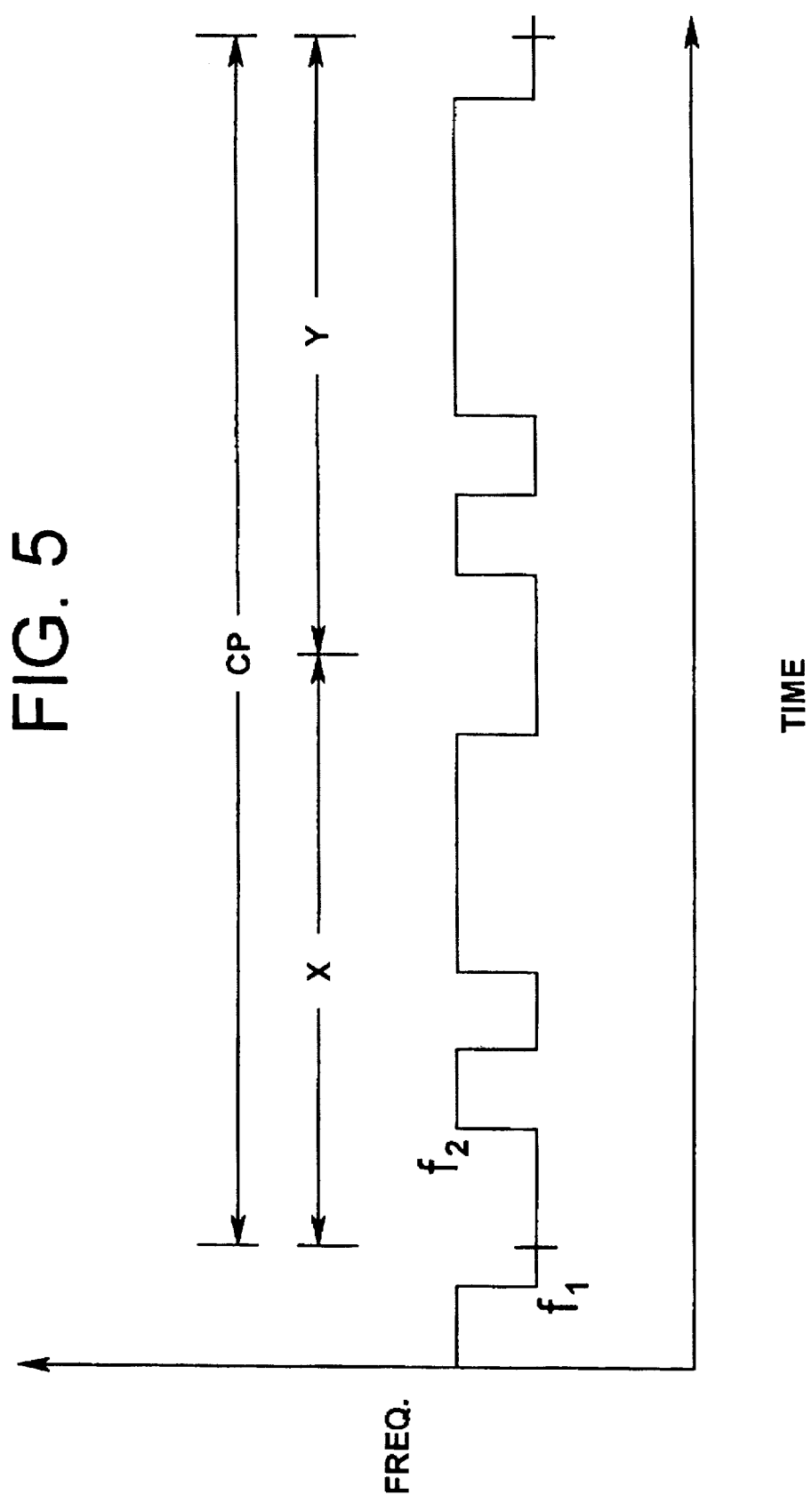
FIG. 5 illustrates an exemplary correlation interval showing frequency versus time.

FIG. 5 illustrates a correlation time period CP for a hypothetical two frequency hopped signal. Within the period CP a non-periodic arrangement of the received frequencies, $f_1$ or $f_2$, and are processed during a first time interval that is represented by "X". For efficiency of correlator design it is recommended that the non-periodic frequency arrangement of time interval X be repeated in interval Y, thereby improving correlation throughput without requiring a periodic approach as disclosed in known prior art.

Figure 6:
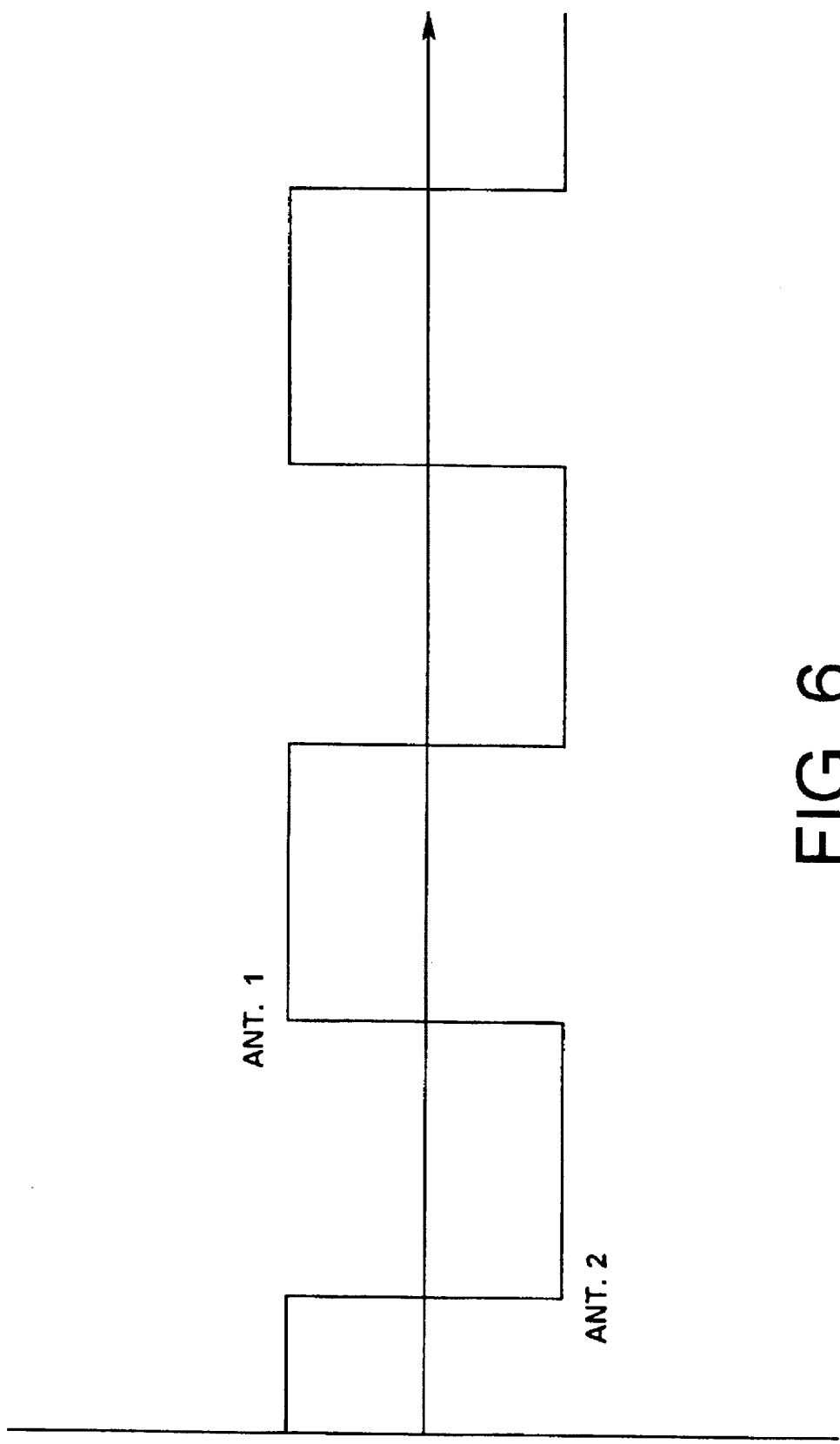
FIG. 6 illustrates an exemplary graph of signal reception between a pair of antenna on a system utilizing the state machine device of FIG. 3.

In addition to signal synchronization, the disclosed invention may be utilized with antenna to optimize reception, as illustrated in FIG. 6. The correlator is alternatively loaded with the received signal via antenna A or B and contrasted for anticipated symmetry via logic means 315 (FIG. 3). Should the output from one signal consistently vary over a measurable time period, that antenna use can be discontinued for concern of corrupt data.

Figure 8:
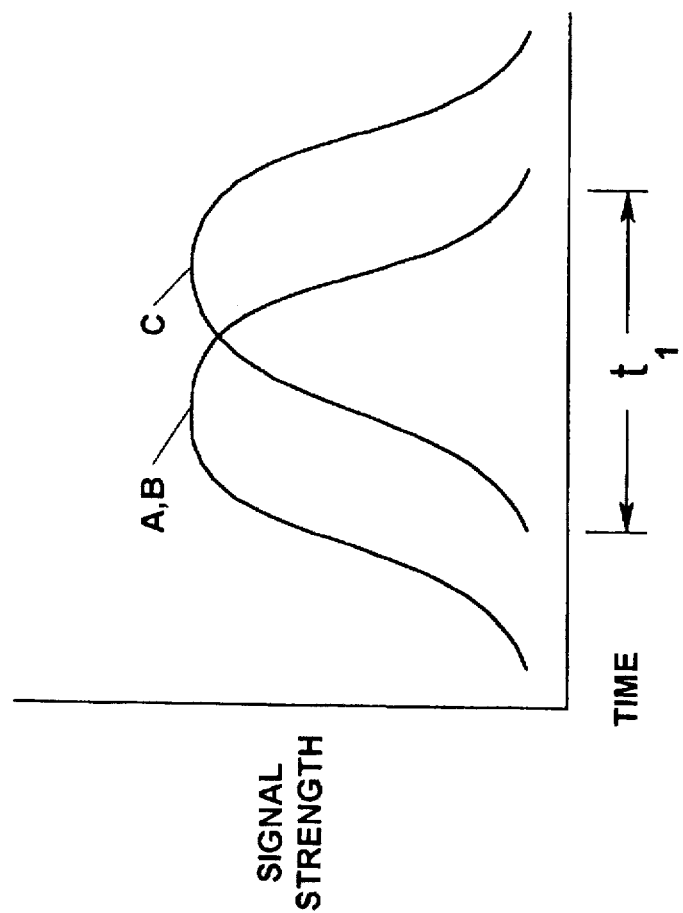
FIG. 8 illustrates the timing diagram of the processed signal of FIG. 7.
Figure 7:
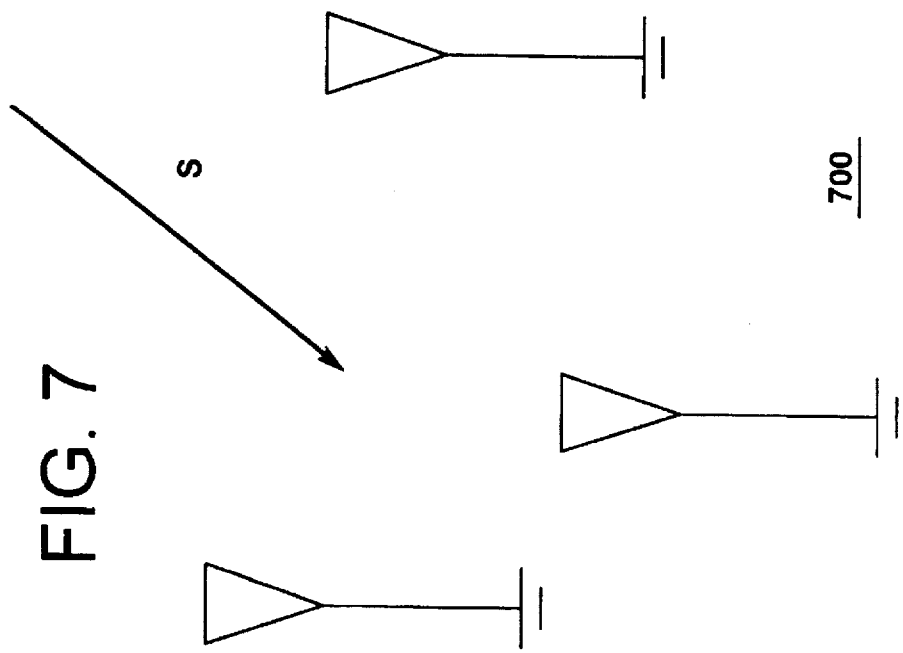
FIG. 7 illustrates the angle of arrival of a given signal into multiple antenna of a given receiver/system.

FIGS. 7 and 8 illustrate another use of the disclosed invention. Specifically, by controlling the correlation process of a signal on spatially oriented antenna an angle of arrival can be determined for the incoming signal. FIG. 7 illustrates a signal S, displayed in vector format indicating its general direction of travel to an antenna array 700 that is comprised of three elements A, B, and C. The elements are spaced in a general triangular pattern and are utilized in a system such as the one described in FIG. 3 above. Although the system of FIG. 3 illustrates two antenna and two frequencies, the inclusion of a third antenna element is readily implemented. The timing diagram of FIG. 8 represents the plot of signal peak versus time for each of the antenna elements A, B, and C. Given the example of FIG. 7, the peaks during time interval $t_1$ can be utilized to determine an approximate angle of arrival, as determined by the logic means 315 via the selected controlling of antenna via the state machine device 314 (FIG. 3). Similarly, alternate signal peak configurations of the three elements would indicate alternate angle of arrivals.

While particular embodiments of the present invention have been shown and described, it should be clear that changes and modifications may be made to such embodiments without departing from the true scope and spirit of the invention. It is intended that the appended claims cover all such changes and modifications.

We claim:

1. A system for receiving and processing transmitted signals, comprising:

an antenna;

a plurality of receivers coupled to the antenna and tunable to the frequencies upon which the signal is transmitted;

a correlator for obtaining synchronization between the receivers and the transmitted signals;

a first switch disposed between the receivers and the correlator thereby coupling each receiver to the correlator;

a state device coupled to the correlator and the receivers that provides an enabling signal to the receiver and a corresponding decode mask to the correlator for synchronizing the transmitted signal; and a code generator coupled to the state device providing a predetermined code sequence for use in obtaining system synchronization.

2. The system of claim 1, wherein the correlator provides synchronization for non-periodic signals.

3. The system of claim 1, wherein two receivers are utilized.

4. The system of claim 1, wherein the correlator is provided with synchronization mask that is asymmetrical with respect to a signal format for each given frequency.

5. The system of claim 1, wherein the correlator provides synchronization for continuous wave signals.

6. The system of claim 5, wherein the correlator expends an unequal time period for each frequency signal correlated.

7. A system for receiving and processing frequency-hopped transmitted signals, comprising:

an antenna array having switchable elements physically mounted in alternate locations;

a plurality of receivers coupled to the antenna array and tunable to the frequencies that the signal is transmitted;

a correlator for obtaining synchronization between the receivers and the transmitted signals;

a first switch disposed between the receivers and the correlator thereby coupling each receiver to the correlator;

additional processing means coupled to the correlator output signal;

a second switch disposed between and coupled to each of the receivers and antenna elements;

a state device coupled to the correlator, the receivers, and the antenna elements that provides an enabling signal to one or more of the antenna elements, the receivers and a corresponding decode mask to the correlator for synchronizing the transmitted signal; and a code generator coupled to the state device providing a predetermined code sequence for use in acquiring system synchronization.

8. The system of claim 7, wherein the correlator provides synchronization for non-periodic signals.

9. The system of claim 7, wherein two receivers are utilized.

10. The system of claim 7, wherein the correlator is loaded with a synchronization mask that is asymmetrical with respect to a signal format for each signal frequency.

11. The system of claim 7, wherein the correlator provides synchronization for continuous wave signals.

12. The system of claim 11, wherein the correlator expends an unequal time period for each frequency signal correlated.

13. The system of claim 7, wherein the angle of arrival of the transmitted signal may be determined via the simultaneous enabling of each antenna element and corresponding evaluation of signal reception.

* * * * *